United States Patent [19]

Kim

[11] Patent Number: 5,555,449
[45] Date of Patent: Sep. 10, 1996

[54] EXTENDIBLE ANTENNA AND MICROPHONE FOR PORTABLE COMMUNICATION UNIT

[75] Inventor: Seung K. Kim, Chapel Hill, N.C.

[73] Assignee: Ericsson Inc., Research Triangle Park, N.C.

[21] Appl. No.: 399,663

[22] Filed: Mar. 7, 1995

[51] Int. Cl.⁶ .................................................. H04B 1/38
[52] U.S. Cl. ........................... 455/89; 379/433; 381/154; 381/169; 455/90; 455/129
[58] Field of Search .................. 455/89, 90, 97, 455/129; 379/433; 381/122, 154, 168, 169; 343/702, 900

[56] References Cited

U.S. PATENT DOCUMENTS

| | | | |
|---|---|---|---|
| 2,681,412 | 6/1954 | Webster | 343/900 |
| 3,555,422 | 1/1971 | Buehrle, Jr. et al. | |
| 4,694,301 | 9/1987 | Wassum | 343/720 |
| 4,831,656 | 5/1989 | Southern et al. | 381/169 |
| 4,847,818 | 7/1989 | Olsen | 368/10 |
| 4,882,745 | 11/1989 | Silver | 379/61 |
| 4,910,795 | 3/1990 | McCowen et al. | 455/95 |
| 5,138,651 | 8/1992 | Sudo | 379/61 |
| 5,197,091 | 3/1993 | Takagi et al. | 455/90 |
| 5,329,593 | 7/1994 | Lazzeroni et al. | 381/168 |
| 5,381,460 | 1/1995 | Ohashi et al. | 379/58 |
| 5,446,789 | 8/1995 | Loy et al. | 379/433 |

FOREIGN PATENT DOCUMENTS 0198436  8/1991  Japan ........................ 455/89

*Primary Examiner*—Reinhard J. Eisenzopf
*Assistant Examiner*—Neil Brier

[57] ABSTRACT

A combination antenna and microphone extension assembly is rotatably mounted on a portable communication unit to enable deployment from a stored position alongside the housing of the unit to an extended operating position with the antenna deployed and a speaking region connected through an acoutstic cavity in the assembly to the microphone on the unit providing extended spacing between the speaker on the housing and the speaking region to span the distance between the mouth and ears of the user.

9 Claims, 1 Drawing Sheet

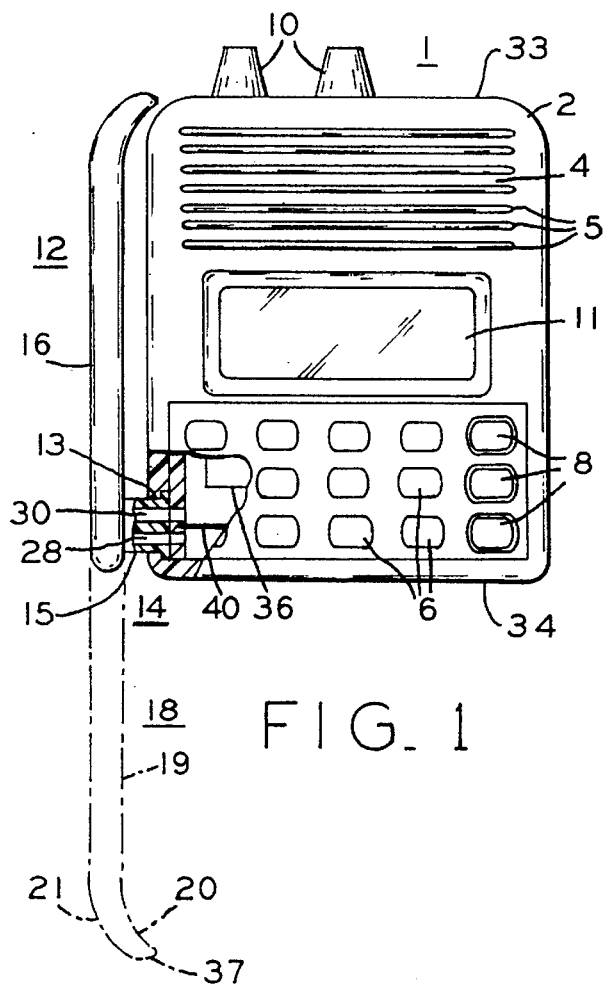
FIG_1
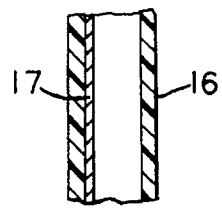
FIG_3
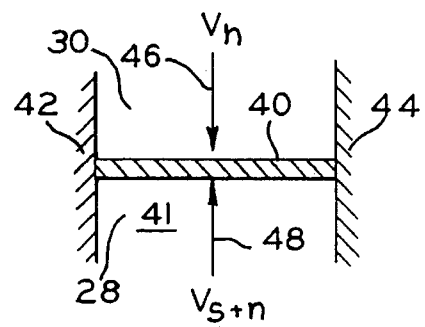
FIG_4
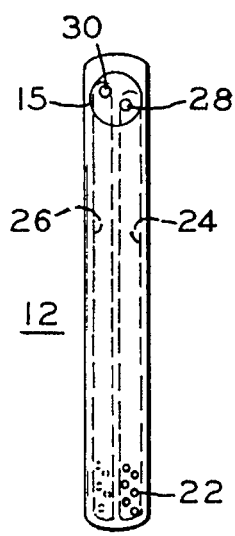
FIG_2
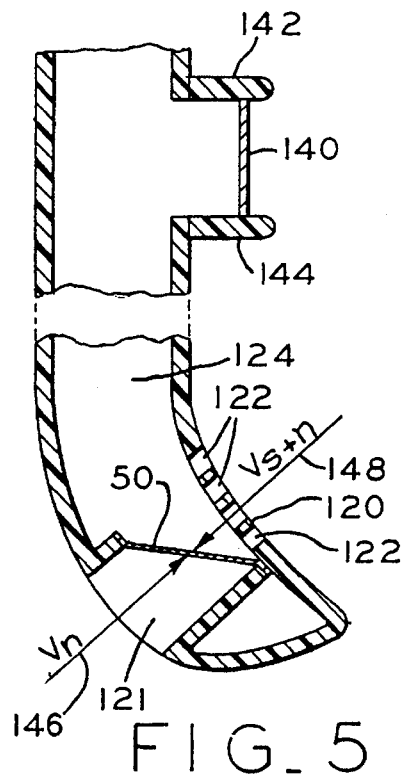
FIG_5

EXTENDIBLE ANTENNA AND MICROPHONE FOR PORTABLE COMMUNICATION UNIT

BACKGROUND OF THE INVENTION

This invention relates generally to portable communications units, and more particularly, to an improved extendible antenna and microphone combination.

Portable communications units, such as mobile radios and wireless (or cellular) telephones, are continually being reduced in size and weight, as a result of semiconductor integrated circuitry and improvements in the power source and power utilization. It has become possible and highly desirable to provide personal hand-held portable communications units the size of a cigarette pack or even smaller.

One problem that arises with compact portable communication units is the lack of space available to separate the microphone, or mouthpiece, from the speaker, or earpiece. The ease and comfort of a conventional telephone, in which the handset includes spacing of the microphone and speaker to accommodate the distance between the user's mouth and ear is common, desirable, and acceptable. Users find it difficult to utilize communications units in which the microphone and speaker are not spaced apart four or more inches to enable usage without shifting the position of the communication unit between a talk position and a listen position. In addition, as communication units become smaller to enable and facilitate carrying in a shirt pocket, there is a corresponding but conflicting desire to shorten the required antenna and/or preclude the antenna from extending beyond the compact pocket-size communication unit, which may be on the order of only two by three inches.

An additional problem encountered in the miniaturization of portable communication units is the problem of background noise. The units are frequently utilized in an outdoors, noisy environment, and the small size of the instrument does not provide any significant barrier or sound baffle to the background noise. As a result, it is highly desirable to minimize or cancel background noise in such communication units.

Still further it is desirable to avoid electrical connections to any Extendible microphone, particularly in proximity to an antenna.

OBJECTS AND SUMMARY OF THE INVENTION

Accordingly, it is an object of the present invention to provide an improved portable communication unit suitable for miniaturization.

It is another object of the present invention to provide an improved portable communication unit in which the antenna and speaker may be readily stowed in a compact carrying position.

It is still another object of the present invention to provide an improved portable communication unit in which a microphone extension and the antenna may be readily deployed from a stowed to an operating position while avoiding extending microphone wires through the antenna assembly.

It is yet another object of the present invention to provide an improved portable communication unit which can be miniaturized, yet selectively provide comfortable spacing between the speaking and listening regions, and to provide background noise cancellation.

In order to attain the above and other related objectives, in carrying out the present invention in one form thereof, a portable communication unit is provided with a hand-held housing supporting a rotatable antenna assembly with a stored position contiguous to the housing, and a rotated operating position in which the support member extends outward from the housing. The support member provides a speaking region remote from the housing when in the operating position, while extending the antenna positioned along the support member. An acoustic cavity extends along the support member to a speaker positioned on the housing, adjacent to the rotatable support, such that the speaking region is positioned remote from the housing when in the operating position, providing additional spacing between the speaker on the housing and the speaking region on the end of the support member. The microphone may be a condenser microphone or a silicon micromachined microphone, and a second acoustic cavity may extend from the opposite side of the microphone to the surface of the support member opposite the speaking region to provide a background noise reduction input to the microphone.

BRIEF DESCRIPTION OF DRAWINGS

FIG. 1 shows a portable communication unit incorporating the present invention.

FIG. 2 is a right-side view of the extendible and rotatable antenna and voice assembly of FIG. 1.

FIG. 3 is an enlarged cross-sectional view of a portion of FIG. 1.

FIG. 4 is a diagram useful in explaining the operation of the noise canceling feature of FIGS. 1 and 2.

FIG. 5 shows an alternate embodiment of a portion of FIG. 2.

Referring first to FIG. 1. Portable hand-held communication unit 1 includes a molded housing 2 of insulating material, on which is positioned a loudspeaker or speaker 4 behind an appropriate grille 5, and a key pad control 6 for channel or number selection. Portable communication unit 1 may be a portable or mobile radio or a cellular or wireless telephone, and may include additional controls such as 8 and 10, and an LCD display or indicator 11 for indicating the telephone number or channel.

Cup-like rotatable support 14 includes socket 13 molded integral with housing 2 and a mating extension 15 (see FIG. 2) on antenna assembly 12. FIG. 1 shows antenna assembly 12 in both the stored position and the operating position, with operating position 18 of the antenna assembly being shown dotted. In the stored position, antenna assembly 12 is positioned parallel to, and contiguous to, housing 2 enabling communication unit 1 to be readily carried, for example, in a shirt pocket of the user.

Antenna assembly 12 may be readily rotated to operating position 18 shown in FIG. 1, extending antenna 17, a metallic strip secured along support member 16 (see FIG. 3). Antenna assembly 12 also includes a pair of longitudinal acoustic channels, 24 and 26, extending between connecting member 15 and curved or concaved speaking region 20 at the remote or distal end 37 of the antenna assembly. A plurality of apertures 22 connect to a first acoustic passage or cavity 24 which extends along support member 16 (shown dotted as 19 in operating position 18) between speaking region 20 and connecting member 15. Background noise pickup cavity 21 on the surface of support member 19, opposite speaking region 20, is connected to second acoustic passage or cavity 26 which extends longitudinally along support member 19 to connecting member 15. As best illustrated by FIG. 2, first acoustic cavity 24 is connected to, and terminates at, first aperture 28 in extension 15; while second acoustic cavity 26 is connected to, and terminates at, second aperture 30 in extension 15; such that first aperture 28 in connecting member 15 is directly connected to aperture 22 of speaking region 20 while second aperture 30 in the connecting member is connected to background noise pickup 21.

As shown in FIG. 4, noise cancelling condenser microphone 41 of portable communication unit 1 is supported on housing 2 and extends in the same direction as, but is positioned between, first aperture 28 and second aperture 30. Noise cancelling condenser microphone diaphragam 40 is positioned between and separates first aperture 28 and second aperture 30, such that the sound signals provided from speaking region 20 and background noise pickup 21, respectively, are provided to opposite sides of the microphone diaphragm. Noise cancelling consenser microphone 41 cancels background noise by feeding desired speech sound or audio signals to one side of diaphragm 40 and/or feeding undesired background noise to the opposite side of the diaphragm. As best shown in FIG. 4, noise cancelling condenser microphone 41 is supported at its ends by supports 42 and 44, which may conveniently be molded as part of housing 2. As is well known in the art, the resulting vibration of diaphragm 40 inside condenser microphone 41 by sound waves is utilized to provide an electrical signal which is detected and amplified by the electronic circuitry unit indicated generally as 36 of portable communication unit 1. The signal indicated by arrow 48 in first aperture 28 is the $V_{S+N}$ signal, that is, the voice signal plus background noise; while the signal indicated by arrow 46, or $V_N$, or the voice signal in second aperture 30 is the background noise signal provided through second aperture 30 to the opposite side of condenser microphone diaphragm 40. As a result, the resultant signal provided by condenser microphone diaphragm 40 is $V_{resultant} = V_{S+N} - V_N = Vs$ or the voice signal without the background noise. The background noise has thus been cancelled or eliminated.

In normal use, concave curved speaking region 20 is positioned approximately adjacent to the mouth of the user of portable communication unit 1, while background noise pickup 21 can readily be positioned by the user to point toward the prevalent background noise to enable background noise cancellation from being transmitted by portable communication unit 1 to the person receiving the communication from the portable communication unit.

An alternate embodiment of background noise pickup 21 of antenna assembly 12 is illustrated in FIG. 5. Referring to FIG. 5, membrane 50 is positioned across background noise pickup opening 121, such that the background noise signal indicated by arrow 146 directly impinges upon the membrane, which may be of a thin metal or mylar. Membrane 50 is positioned opposite speaking region 12, such that voice signal 148, which includes voice signal plus background noise, is directed against the opposite side of membrane 50 through apertures 122 of the speaking region. As such, the background noise cancellation occurs directly at membrane 50, and the voice signal with background noise cancellation is conducted through a single acoustic cavity 124, through extension 15 to one side of condenser microphone 140 supported between supports 142 and 144 as shown in detail in FIGS. 1 and 2. A condenser microphone diaphragm could be used to replace membrane 50.

It is to be noted that loudspeaker 4 is positioned adjacent one end 33 of housing 2 while rotable support 14 is positioned adjacent opposite end 34. When antenna assembly 12 is deployed or rotated to operating position 18, speaking region 20 of distal or remote end 37 of antenna assembly 12 is extended a significant distance from speaker or earpiece 4 (which may be concaved to fit the ear as in a conventional telephone). Depending on the size of housing 2, the distance can readily be in the range of 4–6 inches which provides a comfortable spacing between speaking region 20 and earpiece 4 comparable to that provided by a conventional telephone. This more comfortably and more naturally spans the distance between the mouth and ear of the user enabling convenient, comfortable use without shifting of the communication unit between talk (or transmit) and listen (or receive) positions.

Also, it is to be noted that acoustic cavities 24 and 26 effectively extend the positioning of microphone diaphragm or membrane 40 without any electrical wires or leads extending along antenna assembly 12 which could intefere with reception and transmission and which would add cost and complexity including requiring a rotary electrical joint which also would be source of potential future wear and/or operational problems.

First acoustic cavity 24 and second acoustic cavity 26 (see FIG. 2) can be molded integral with antenna assembly 12. Alternatively, the acoustic cavities 24 and 26 could be molded as channels extending along support member 19, with the open channels being closed by a metallic strip antenna 17.

While the present invention has been described with respect to certain preferred embodiments thereof, it is to be understood that numerous variations in the details of construction, the arrangement and combination of parts, and the type of materials used may be made without departing from the spirit and scope of the invention.

What I claim is:

1. A portable communication unit comprising:

a housing adapted to be hand held;

a loudspeaker mounted on said housing;

an antenna assembly including an antenna and a support member rotatably mounted on said housing, having a stored position with said support member positioned continguous to said housing and an operating position in which said support member extends outward away from said housing with a speaking region on said support member positioned remote from said housing;

said antenna positioned along said support member;

a first acoustic cavity extending along said support member from said speaking region to said housing;

a microphone diaphragm positioned adjacent the housing end of said acoustic cavity;

whereby said speaking region is positioned remote from said speaker when in said operating position;

wherein said antenna assembly is rotatably supported on said housing to enable the rotation thereof between said stored position which is substantially parallel and adjacent to said housing, and said operating position;

said speaking region includes at least one aperture through said support member and positioned on the side of said support member closest to said housing when said assembly is in said stored position;

said antenna comprises a metal strip extending along said support member substantially parallel to said acoustic cavity;

wherein an opening is provided on the surface of said support member opposite said speaking region, and connected to a second acoustic cavity connected to the opposite side of said diaphragm of said microphone to provide background noise cancellation; and said first and second acoustic cavities are substantially parallel channels extending axially along said support member.

2. The portable communication unit of claim 1 wherein a speaker is positioned on said housing proximate to the end of said housing remote from said rotatable support for said antenna assembly.

3. The portable communication unit of claim 2 wherein said support member is formed of an electrical insulating material.

4. The portable communication unit of claim 3 wherein said portable communication unit is a mobile radio including semiconductor integrated circuitry for transmitting a radio signal.

5. The portable communication unit of claim 1, wherein a membrane is supported proximate to said speaking region and connected to said voice chamber on one side and connected on the opposite side to the surface of said support member opposite said speaking region to enable background noise cancellation of the audio signals impinging on said membrane, and said membrane is connected to said first acoustic cavity.

6. The portable communication unit of claim 5 wherein said membrane is supported on supports integral with said support member.

7. A portable communication unit comprising:

a housing adapted to be hand held;

a loudspeaker mounted on said housing;

an antenna assembly including an antenna and a support member rotatably mounted on said housing, having a stored position with said support member positioned contiguous to said housing and an operating position in which said support member extends outward away from said housing with a speaking region on said support member positioned remote from said housing;

said antenna positioned along said support member;

a first acoustic cavity extending along said support member from said speaking region to said housing;

a microphone diaphragm positioned adjacent said acoustic cavity;

whereby said speaking region is positioned remote from said speaker when in said operating position;

wherein said antenna assembly is rotatably supported on said housing to enable the rotation thereof between said stored position which is substantially parallel and adjacent to said housing, and said operating position;

said speaking region includes at least one aperture through said support member to said diaphragm and positioned on the side of said support member closest to said housing when said assembly is in said stored position;

said antenna comprises a metal strip extending along said support member substantially parallel to said acoustic cavity; and wherein an opening is provided on the surface of said support member opposite said speaking region, which is connected to the opposite side of said diaphragm of said microphone to provide background noise cancellation.

8. The portable communication unit of claim 7 wherein a diaphragam having a first and second surface is positioned proximate to said speaking region with said first surface contiguous to said voice chamber and said second surface is connected to the region of said support member opposite said surface of said support member to provide background noise cancellation of the audio signals impinging on said membrane.

9. The portable communication unit of claim 8 wherein said diaphragm is a condenser microphone diaphragm.

* * * * *